(12) United States Patent
Cornish

(10) Patent No.: US 8,869,582 B2
(45) Date of Patent: Oct. 28, 2014

(54) DIE APPARATUS FOR FORGING STEERING RACKS

(75) Inventor: Wayne Bruce Cornish, Padstow (AU)

(73) Assignee: Bishop Steering Technology Pty Ltd, Rosehill (AU)

( * ) Notice: Subject to any disclaimer, the term of this patent is extended or adjusted under 35 U.S.C. 154(b) by 140 days.

(21) Appl. No.: 13/643,344

(22) PCT Filed: Apr. 29, 2011

(86) PCT No.: PCT/AU2011/000501
§ 371 (c)(1),
(2), (4) Date: Oct. 25, 2012

(87) PCT Pub. No.: WO2011/140580
PCT Pub. Date: Nov. 17, 2011

(65) Prior Publication Data
US 2013/0042662 A1    Feb. 21, 2013

(30) Foreign Application Priority Data

May 10, 2010  (AU) ................................ 2010901969

(51) Int. Cl.
| | | |
|---|---|---|
| *B21D 22/00* | (2006.01) | |
| *B21J 5/12* | (2006.01) | |
| *B21J 13/02* | (2006.01) | |
| *B21K 1/76* | (2006.01) | |
| *B62D 3/12* | (2006.01) | |

(52) U.S. Cl.
CPC . *B62D 3/126* (2013.01); *B21J 5/12* (2013.01); *B21J 13/025* (2013.01); *B21K 1/767* (2013.01)
USPC ........................................ 72/353.2; 72/353.6

(58) Field of Classification Search
CPC ........... B21D 22/06; B21K 1/767; B21J 5/02; B21J 5/12; B21J 13/02; B21J 13/025
USPC ........... 72/352, 353.2, 353.6, 354.2, 357, 358
See application file for complete search history.

(56) References Cited

U.S. PATENT DOCUMENTS

| | | |
|---|---|---|
| 4,571,982 A | 2/1986 | Bishop et al. |
| 4,713,958 A * | 12/1987 | Bulso et al. ..................... 72/348 |
| 5,862,701 A | 1/1999 | Bishop et al. |

FOREIGN PATENT DOCUMENTS

| | | |
|---|---|---|
| DE | 3718884 A1 | 12/1988 |
| WO | 2005/028141 A1 | 3/2005 |
| WO | 2005/053875 A1 | 6/2005 |
| WO | 2011/017736 A1 | 2/2011 |

* cited by examiner

*Primary Examiner* — Teresa M Ekiert
(74) *Attorney, Agent, or Firm* — Birch, Stewart, Kolasch & Birch, LLP

(57) ABSTRACT

A die apparatus for forging a steering rack having a toothed portion and an array of gear teeth. The die apparatus comprising first and second assemblies movable towards each other. The first assembly comprising a first bolster and a tooth die. The second assembly comprising a second bolster, first and second side dies, a center punch, and a third bolster. The third bolster being disposed between the first and second bolsters and being movable relative to the second bolster. The first and second side dies being supported by the third bolster, and the center punch being supported by the second bolster. As the die apparatus closes, the third bolster abuts the first assembly to form a closed forging cavity and then, as the die apparatus continues to close, the center punch penetrates the closed forging cavity to complete the forging of the steering rack.

14 Claims, 11 Drawing Sheets

DIE APPARATUS FOR FORGING STEERING RACKS

TECHNICAL FIELD

The present invention relates to the manufacture of steering racks for vehicle rack and pinion steering gears, and in particular to a die apparatus for forging steering racks.

BACKGROUND

Typically, vehicle steering racks are manufactured from round solid bar stock with the toothed region broached across the bar near one end. This results in the cross section of the toothed region having a 'D' shape and hence these racks are commonly referred to as "D-racks".

An alternative method of manufacturing a steering rack from round solid bar stock is to forge the toothed region. An advantage of forging is that the teeth may be shaped to have a variable gear ratio. U.S. Pat. No. 4,571,982 (Bishop et al) and U.S. Pat. No. 5,862,701 (Bishop et al) disclose die apparatuses for flashless warm forging steering racks having a toothed region with a "Y" shaped cross section. These types of racks are known as "Y-racks". A disadvantage of these die apparatuses is that they are only suited to forging Y-racks.

Warm forging of steel is well known. The actual temperature used for warm forging depends on the application, and can range from 600° C. to 1000° C. Temperatures in the range 650° C. to 800° C. are particularly well suited to forging precision net shape gear teeth that do not require finish machining.

WO 2005/053875 A1 (Bishop Innovation) discloses various die arrangements for flashless warm forging D-racks in particular. However, an improved die apparatus to implement some of the die arrangements disclosed in WO 2005/053875 A1 is desirable. In particular it is desirable to provide an improved die apparatus suited to forging "large offset" racks. Large offset racks have their teeth closer to the longitudinal centre line of the rack than typical D-racks. Large offset racks have wider teeth than typical D-racks, which makes them suited to column assist steering gears.

Another type of steering rack is the "V-rack". These racks have a cross section having a 'V' shape. An improved die apparatus suited to forging both D-racks and V-racks is also desirable.

It is an object of the present invention to provide an improved die apparatus for forging steering racks, or at least a useful alternative.

SUMMARY OF INVENTION

In a first aspect, the present invention consists of a die apparatus for forging a steering rack from a bar, the steering rack comprising a toothed portion, the toothed portion comprising an array of gear teeth, the die apparatus comprising a first and a second assembly, the first and second assemblies being movable towards each other along an axis by means of a press to forge the steering rack, the first assembly comprising a tooth die supported by a first bolster, the tooth die having a toothed forming surface shaped as the obverse of the gear teeth, the second assembly comprising a second bolster, first and second side dies, and a centre punch, the centre punch being disposed between the first and second side dies and opposite the toothed die, characterised in that the second assembly further comprises a third bolster and a bias means, the third bolster being disposed between the first and second bolsters and being movable relative to the second bolster along the axis, the bias means being adapted to bias the third bolster towards the first assembly, the first and second side dies being supported by the third bolster, and the centre punch being supported by the second bolster, the arrangement being such that as the die apparatus closes, the third bolster abuts the first assembly to form a closed forging cavity and then, as the die apparatus continues to close, the centre punch penetrates the closed forging cavity to complete the forging of the steering rack.

Preferably, the bias means comprises at least one piston, each piston being biased by a hydraulic fluid in a corresponding fluid cavity. Preferably, the piston abuts the third bolster and the fluid cavity is in the second bolster.

Preferably, the die apparatus further comprises at least one gripper adapted to grip the bar as the steering rack is forged. Preferably, the gripper comprises a first gripper half carried by the first assembly, and a second gripper half carried by the second assembly, the first and second gripper halves surrounding the bar as the die apparatus closes.

Preferably, the second gripper half is supported by the third bolster. Preferably, the first gripper half is biased towards the second assembly by means of a hydraulic piston.

Preferably, the at least one gripper comprises two grippers adapted to grip the bar either side of a portion of the bar that is forged into the toothed portion.

Preferably, the centre punch is attached to a centre punch carrier that is attached to the second bolster, the centre punch carrier passing through an opening in the third bolster.

Preferably, the toothed portion further comprises a longitudinal indent on the opposite side of the toothed portion to the array of gear teeth and first and second support surfaces either side of the indent, the centre punch having a forming surface shaped as the obverse of the indent, and the first and second side dies having forming surfaces shaped as the obverse of the first and second support surfaces respectively.

Preferably, the steering rack is a D-rack and the support surfaces are substantially arcuate. Preferably, the steering rack is a V-rack and the support surfaces are substantially flat.

In a second aspect, the present invention consists of a method of manufacturing a steering rack from a steel bar comprising the steps of:

(a) heating a portion of the bar to a temperature suitable for warm forging;

(b) placing the bar into a die apparatus as claimed in claim 1; and (c) closing the die apparatus by means of a press to forge a toothed portion on the bar.

Preferably, the temperature is between 650° C. and 800° C.

BRIEF DESCRIPTION OF DRAWINGS

FIGS. 12, 13 and 14 are detail sectional views of the die elements of the die apparatus shown in FIG. 4 in its open, partially closed, and fully closed positions respectively.

BEST MODE OF CARRYING OUT THE INVENTION

Figure 1:
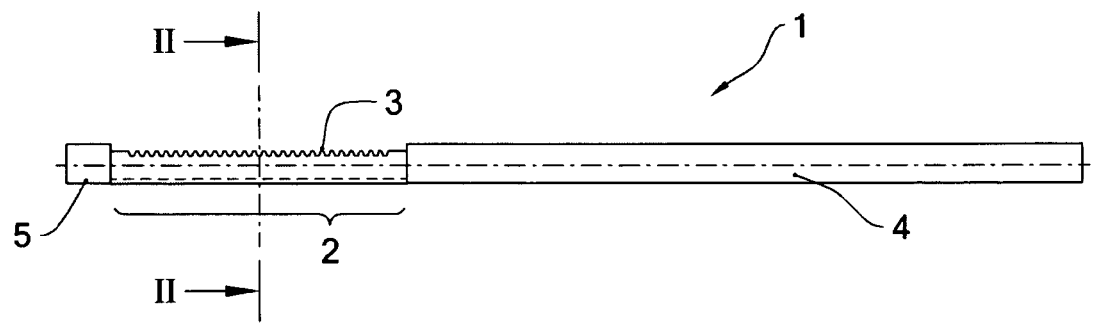
FIG. 1 is a side view of a typical D-rack forged by the die apparatus shown in FIG. 4.
Figure 2:
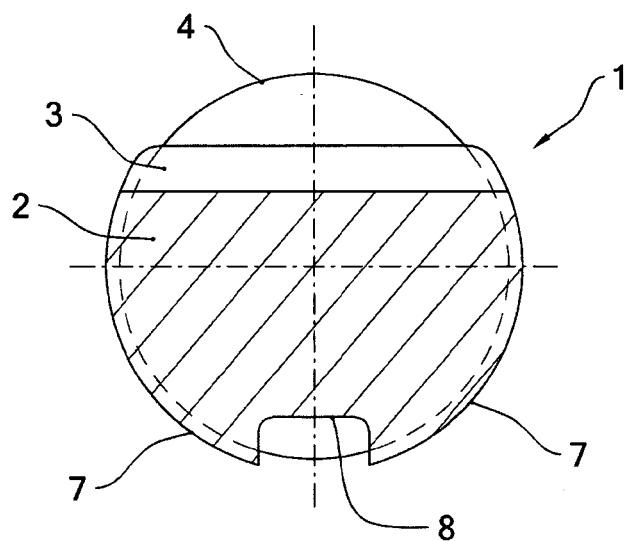
FIG. 2 is a sectional view along II-II of the D-rack shown in FIG. 1.

FIGS. 1 and 2 show a typical steering rack 1 forged by a die apparatus in accordance with the present invention. Rack 1 is a D-rack and it has a toothed portion 2 with an array of forged gear teeth 3. A long cylindrical shank 4 extends from one end of the toothed portion 2, and a short cylindrical portion 5 extends from the other end of the toothed portion 2. FIG. 2 shows the substantially D-shaped cross-section of the toothed portion 2. The toothed portion 2 has a longitudinal indent 8 on the opposite side of the toothed portion 2 to the teeth 3. The longitudinal indent 8 extends the length of the toothed portion 2. The toothed portion 2 has two substantially arcuate support surfaces 7, either side of the indent 8. In an assembled steering gear, a yoke contacts the arcuate support surfaces 7 to guide the rack 1. The rack 1 shown in FIGS. 1 and 2 is in the as forged condition, and further machining operations are required to produce a finished steering rack. However, the toothed portion 2 typically does not require any finish machining as the teeth 3 are typically forged to net shape.

Figure 3:
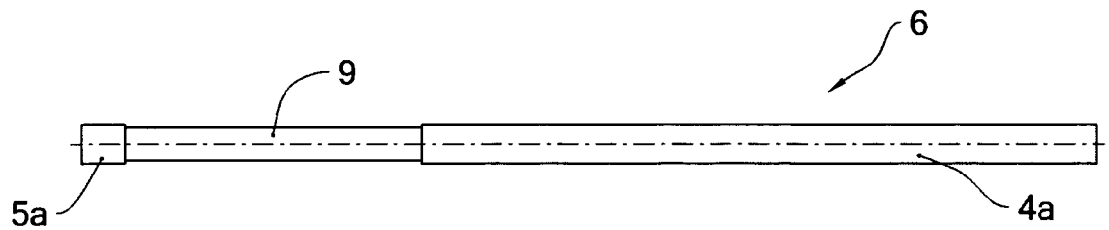
FIG. 3 is a side view of a steel bar used to forge the rack shown in FIG. 1.

FIG. 3 shows a solid steel bar 6 used to forge the rack 1. It has cylindrical portions 4a and 5a, corresponding to portions 4 and 5 of rack 1 respectively, either side of a smaller diameter cylindrical portion 9. Portion 9 becomes toothed portion 2 when the bar 6 is forged, and it is smaller in diameter than portions 4a and 5a to match the cross sectional area of the toothed portion 2. In other not shown embodiments, the steel bar may have a single constant diameter along its length, or may have more complicated profiles, depending on the design of the rack.

FIGS. 4 to 14 show a die apparatus 10, in accordance with the present invention, adapted to forge a rack 1 from a steel bar 6. Die apparatus 10 implements an arrangement of die elements disclosed in WO 2005/053875 A1 (Bishop Innovation). Some details of the construction of die apparatus 10 are not shown, such as various spacers, fasteners, seals and other detail components. A person skilled in the art would understand that these details are necessary to implement the invention. Furthermore, some components shown as constructed as a single continuous piece, may in practice be constructed from several pieces attached together.

Figure 4:
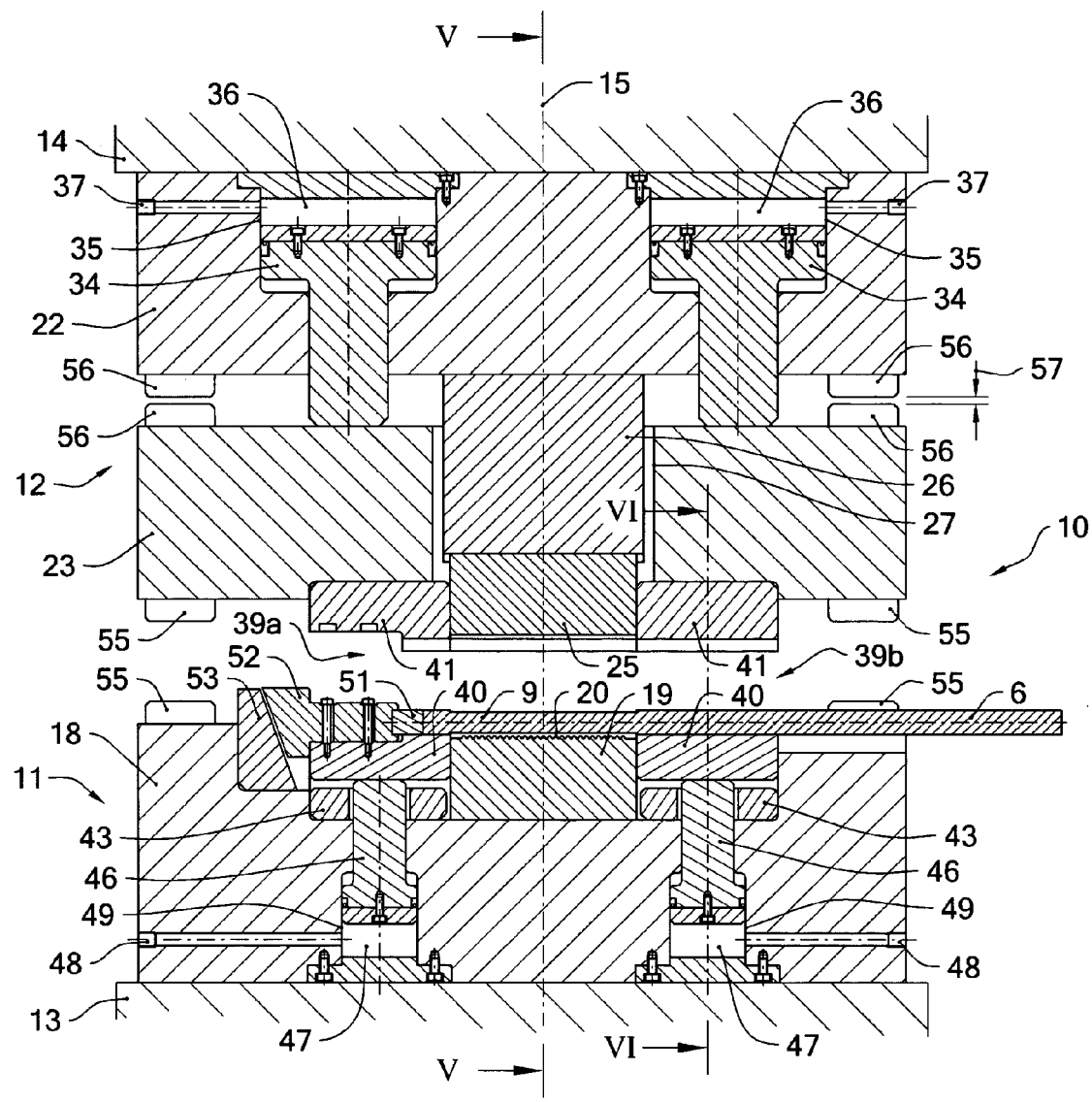
FIG. 4 is a longitudinal sectional view of a die apparatus in accordance with the present invention, shown in its open position.
Figure 5:
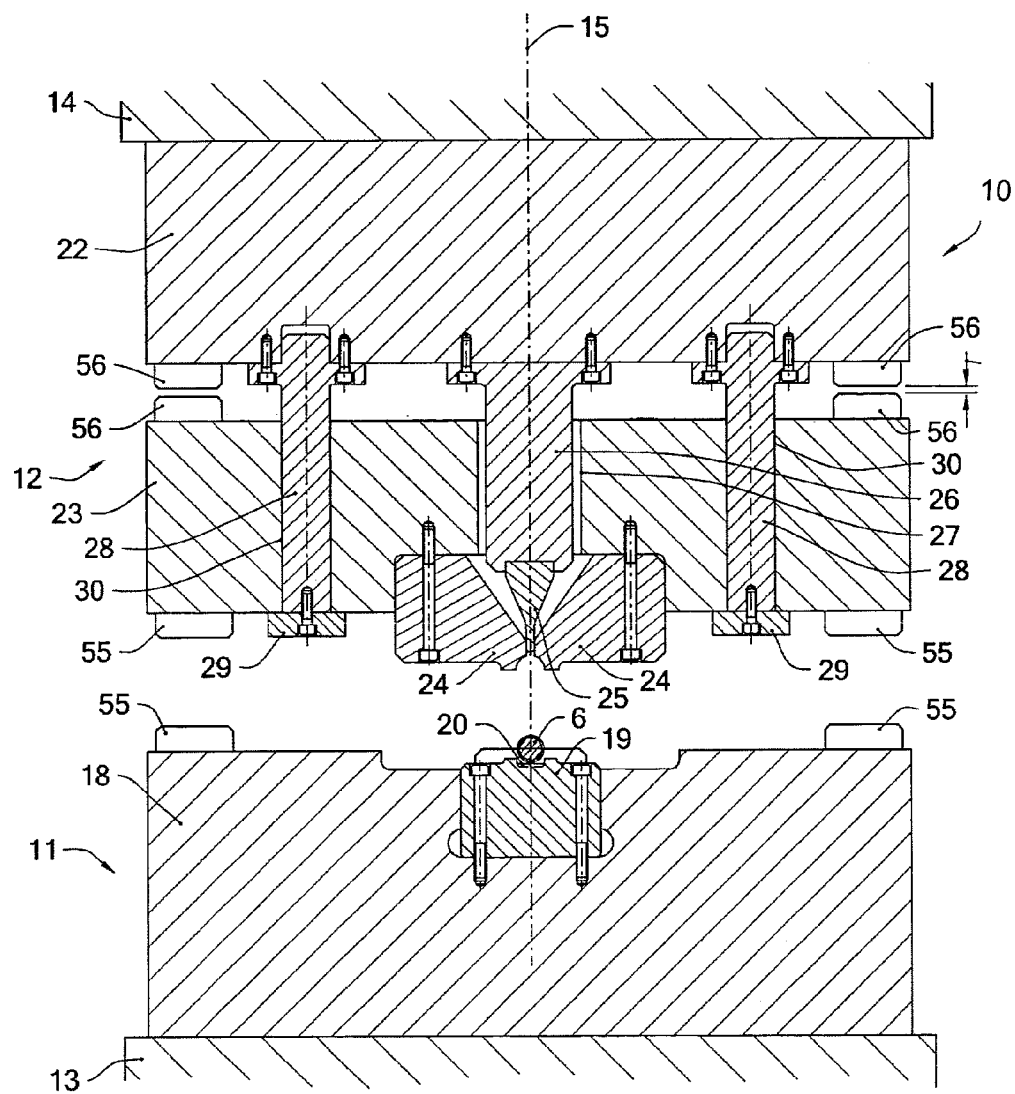
FIG. 5 is a cross section along V-V of the die apparatus shown in FIG. 4.

Referring to FIGS. 4 and 5 in particular, die apparatus 10 comprises a first assembly 11 and a second assembly 12. The assemblies 11 and 12 are attached to the platens 13 and 14 respectively of a press (not shown) such that the assemblies 11 and 12 are movable towards each along an axis 15 by means of the press to forge the rack 1 from the bar 6. Preferably the press is a screw type press.

The first assembly 11 comprises a first bolster 18 and a tooth die 19. The tooth die 19 is attached to and supported by the first bolster 18. The tooth die 19 has a toothed forming surface 20 shaped as the obverse of the teeth 3 of rack 1.

The second assembly 12 comprises a second bolster 22, a third bolster 23, two side dies 24, and a centre punch 25. The third bolster 23 is disposed between the first bolster 18 and the second bolster 22, and it is movable relative to the second bolster 22 along the axis 15. The movement of the third bolster 23 relative to the second bolster 22 is guided by guide posts 28 that are attached to the second bolster 22, and slide in corresponding bores 30 in the third bolster 23. Caps 29 at the ends of guide posts 28 limit the relative downwards movement of the third bolster 23. In other not shown embodiments, the third bolster 23 may be guided by keys instead of guide posts 28.

Contact blocks 55 attached to the first bolster 18 and the third bolster 23 abut against each other to limit the relative movement of the first bolster 18 and the third bolster 23 towards each other as the die apparatus 10 closes. Contact blocks 56 attached to the second bolster 22 and the third bolster 23 abut against each other to limit the relative movement of the second bolster 22 and the third bolster 23 towards each other as the die apparatus 10 closes.

A bias means, adapted to bias the third bolster 23 towards the first assembly 11, comprises pistons 34. The shaft of each piston 34 abuts against the third bolster 23 and slides in a corresponding bore 35 in the second bolster 22. A fluid cavity 36 above each piston 34, in the second bolster 22, is filled with hydraulic fluid through ports 37. When the cavities 36 are pressurised, the pistons 34 are biased downwards, which biases the third bolster 23 towards the first assembly 11. In this example there are two pistons 34. However, in other not shown embodiments there may be any number of pistons, and in one preferred embodiment there are four pistons.

The centre punch 25 is supported, by the second bolster 22 by means of being attached to a centre punch carrier 26 that is attached to the second bolster 22. The centre punch carrier 26 passes through an opening 27 in the third bolster 23. The centre punch 25 is opposite the tooth die 19, and it is disposed between the two side dies 24. The side dies 24 are rigidly attached to and supported by the third bolster 23.

Figure 12:
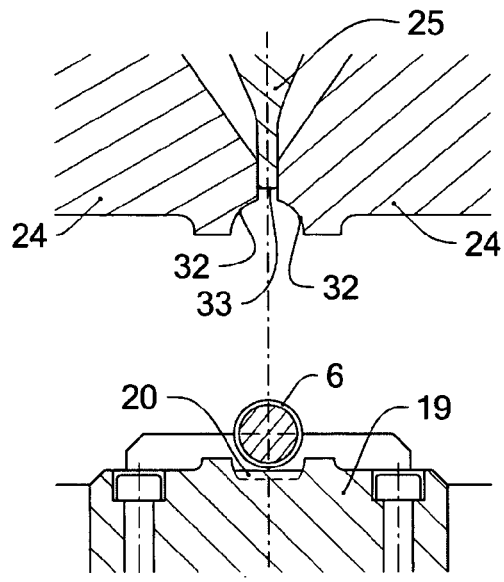
FIGS. 12, 13 and 14 are detail views of FIGS. 5, 8 and 11 respectively.

Referring to FIG. 12 in particular, the centre punch 25 has a forming surface 33 shaped as the obverse of the indent 8 in the toothed portion 2, and the side dies 24 have substantially arcuate forming surfaces 32 shaped as the obverse of the support surfaces 7 of the toothed portion 2.

The tooth die 19, the centre punch 25, and the side dies 24 are replaceable die elements that can be replaced if worn or to forge racks having different designs.

Figure 6:
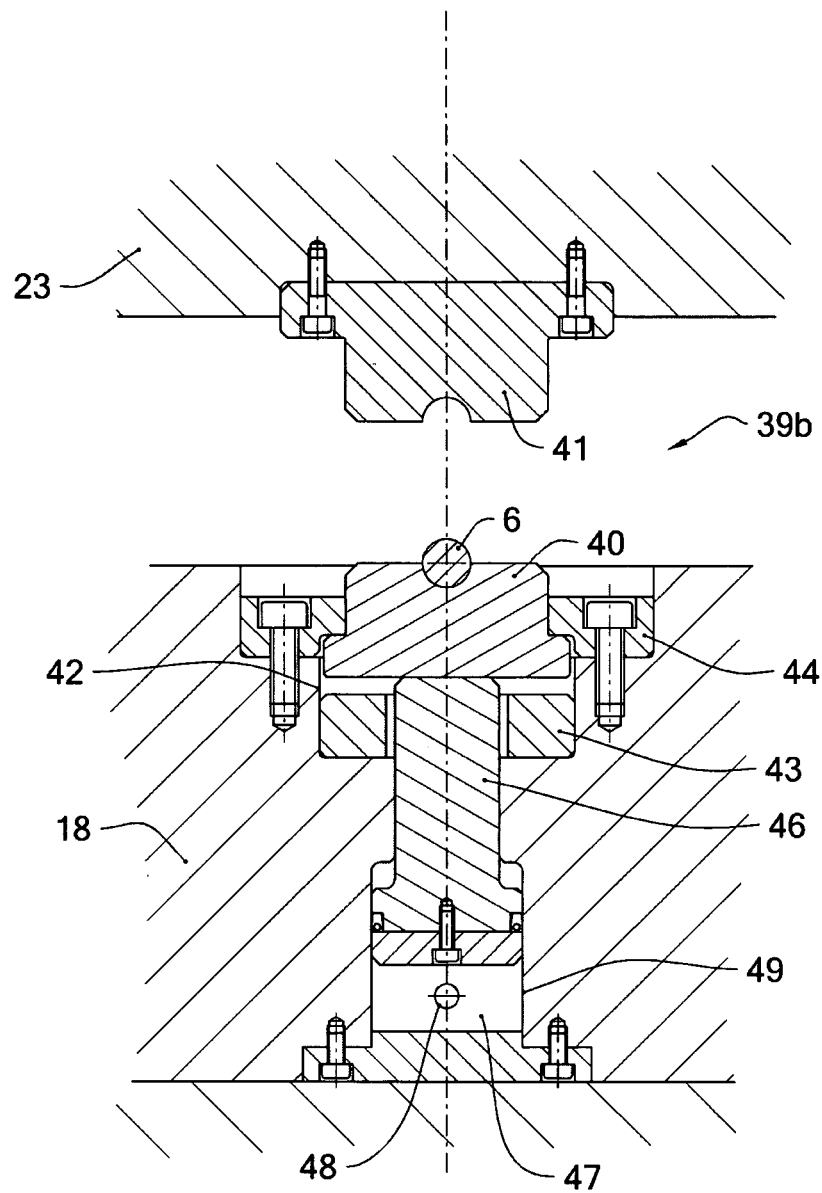
FIG. 6 is a partial cross section along VI-VI of the die apparatus shown in FIG. 4.
Figure 7:
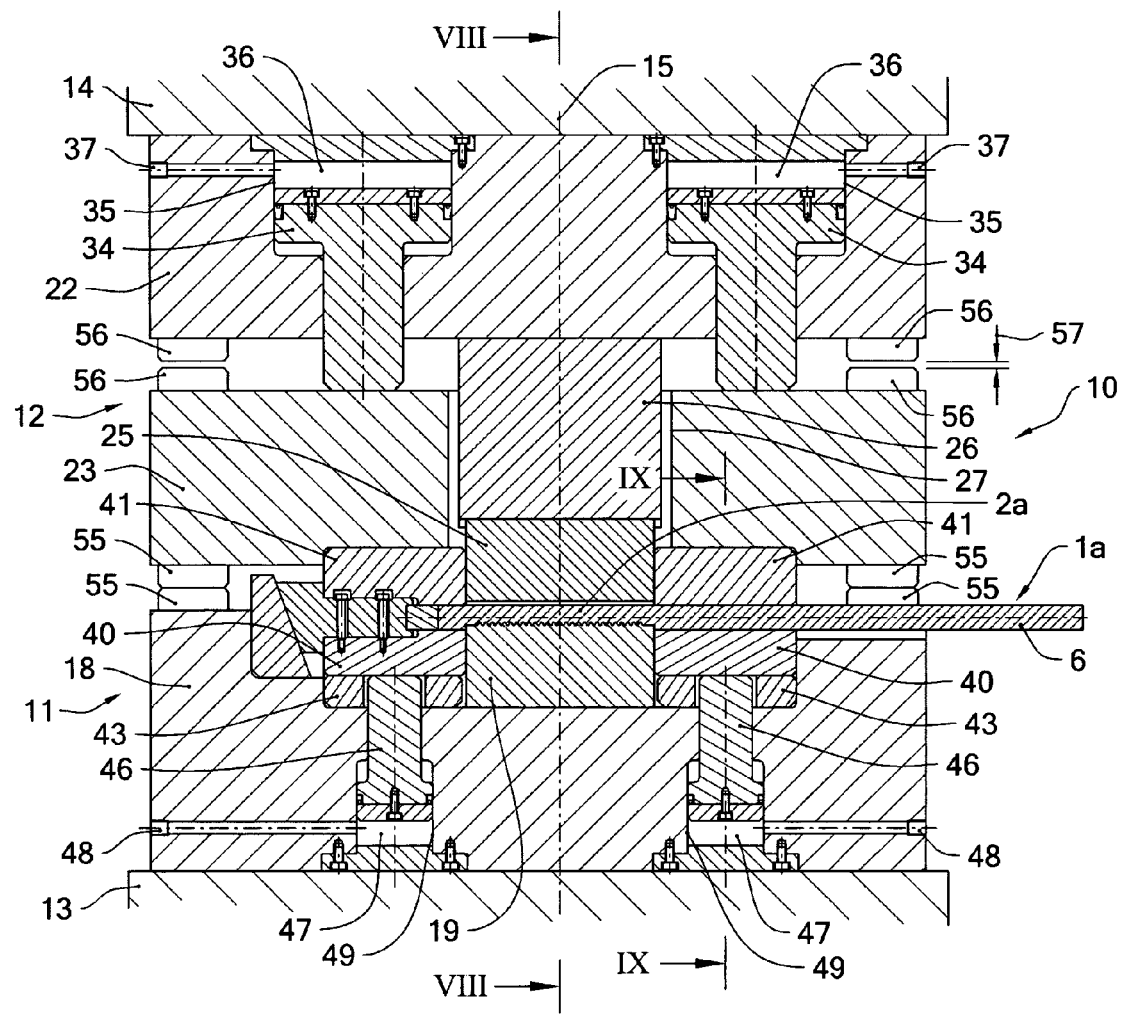
FIG. 7 is a longitudinal sectional view of the die apparatus of FIG. 4, shown in a partially closed position.
Figure 8:
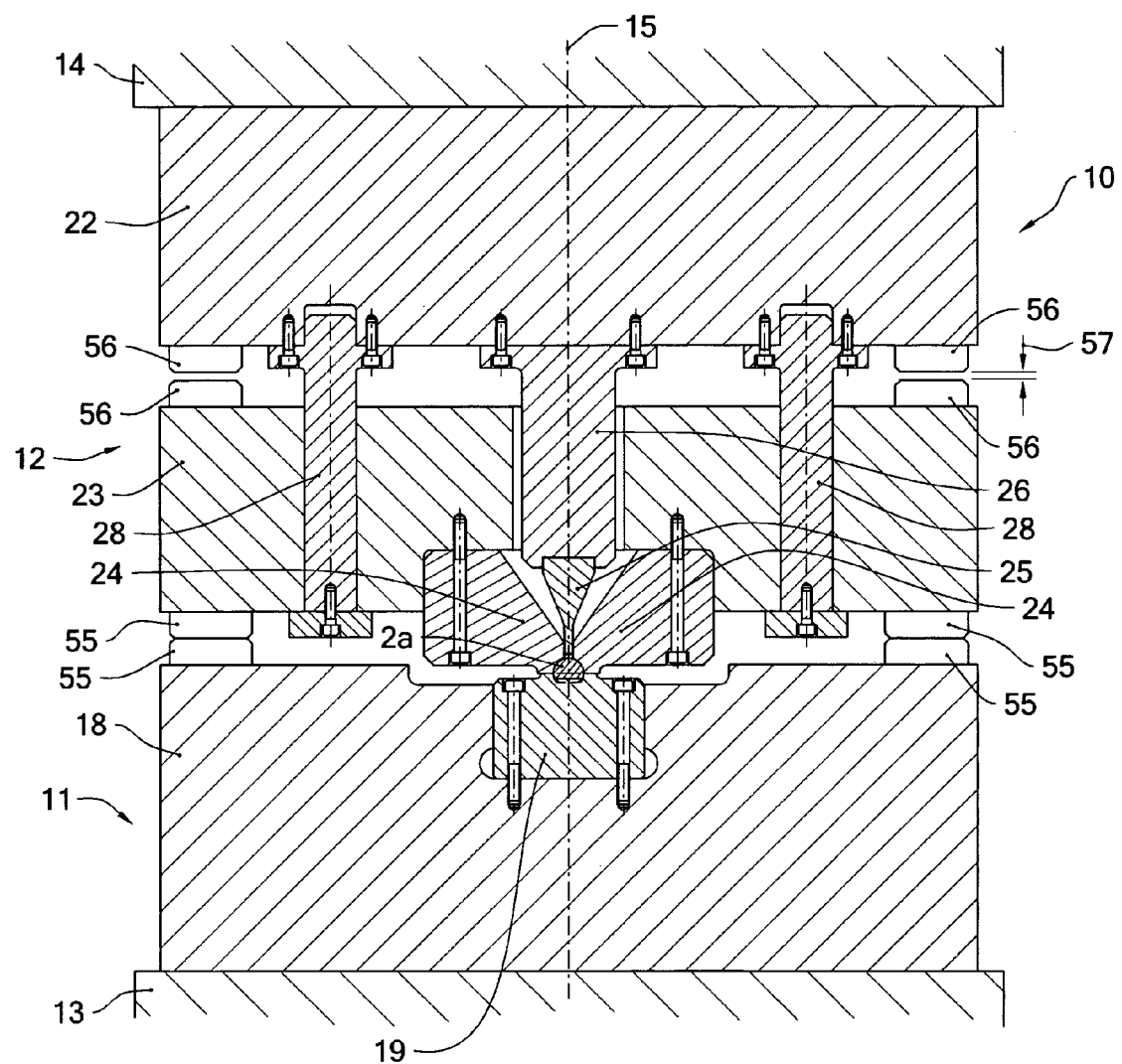
FIG. 8 is a cross section along VIII-VIII of the die apparatus shown in FIG. 7.
Figure 9:
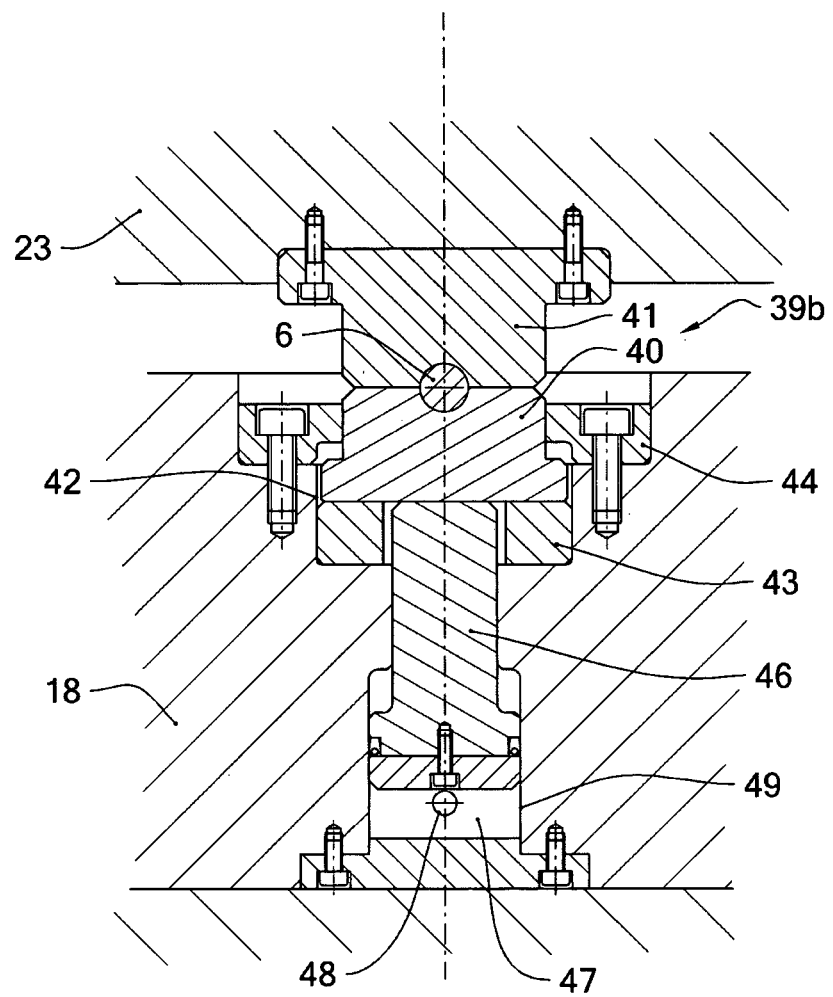
FIG. 9 is a partial cross section along IX-IX of the die apparatus shown in FIG. 7.

Referring to FIGS. 4 and 6 in particular, die apparatus 10 further comprises two grippers 39a and 39b adapted to grip a bar 6 as it is forged into a steering rack 1. Grippers 39a and 39b are adjacent opposite ends of the tooth die 19 such that they are adapted to grip the bar 6 either side of the portion 9 of the bar 6 that is forged into the toothed portion 2. Each of the grippers 39a and 39b comprises a first gripper half 40 carried by the first assembly 11, and a second gripper half 41 carried by the second assembly 12. As shown in FIG. 9, the gripper halves 40 and 41 surround the bar 6 as the die apparatus 10 closes.

Referring to FIG. 6 in particular, the second gripper halves 41 are supported by and attached to the third bolster 23. The first gripper halves 40 are vertically movable within a limited range relative to the first bolster 18. The first gripper halves 40 are guided in slots 42 in the first bolster 18. The downward movement of the first gripper halves 40 is limited by contact with spacers 43, and the upward movement is limited by contact with plates 44.

Each first gripper half 40 is biased towards the second assembly 12 by a hydraulic piston 46. The end of the shaft of each piston 46 abuts its respective gripper half 40 and each piston 46 slides in a corresponding bore 49 in the first bolster 18. A fluid cavity 47 below each piston 46, in the first bolster 18, is filled with hydraulic fluid through ports 48. When the cavities 47 are pressurised, the pistons 46 are biased upwards, which biases the first gripper halves 40 towards the second assembly 12.

Referring to FIG. 4 in particular, a cylindrical end stop 51 is located between the halves 40, 41 of gripper 39a to prevent material being squeezed axially out of the gripper 39a during forging. The end stop 51 is supported by a wedge member 52 that slides on top of the first half 40 of gripper 39a. The wedge member 52 contacts a corresponding wedge block 53, attached to the first bolster 18, as the die apparatus 10 closes to bias the end stop 51 against the end of the bar 6.

The operation of die apparatus 10, and an example method of forging a rack in accordance with the present invention, will now be described.

FIGS. 4, 5, 6 and 12 show die apparatus 10 in its open position with a bar 6 loaded into it. At least the portion of the bar 6 that is forged into the toothed portion 2 is heated to a temperature suitable for warm forging prior to loading it into die apparatus 10. Preferably, this temperature is in the range 650° C. to 800° C. For the example bar 6' shown in FIG. 3, at least portion 9 is heated.

In the open position, the fluid cavities 36 are filled with hydraulic fluid to fully extend the third bolster 23 away from the second bolster 22 such that there is a gap 57 between the contact blocks 56. Also, the fluid cavities 47 are filled with hydraulic fluid to fully extend the first gripper halves 40 away from the first bolster 18. The fluid cavities 36 and 47 are typically pressurised when they are filled.

The press (not shown) is then operated to close the die apparatus 10 by moving the assemblies 11 and 12 towards each along axis 15, which forges the bar 6 into a rack 1. FIGS. 7, 8, 9 and 13 show die apparatus 10 in a partially closed position at which point bar 6 is forged into a partially forged rack 1a having a partially forged toothed portion 2a. In this position, the third bolster 23 has abutted the first assembly 11 by means of the contact blocks 55 abutting each other. In moving from the open position to this partially closed position, the second bolster 22 and third bolster 23 move together and the gap 57 between contact blocks 56 is maintained by means of the downwards bias on the third bolster 23 provided by the pistons 34.

Figure 13:
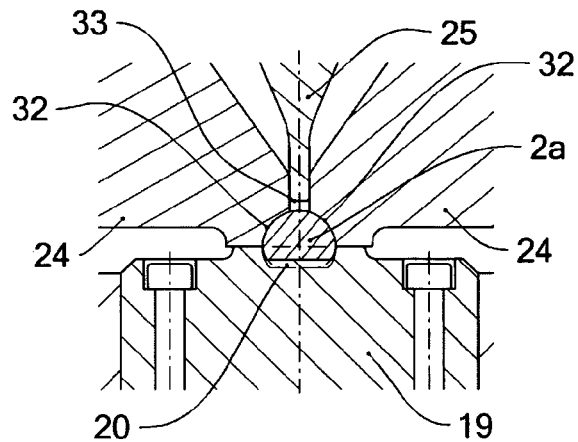

Referring to FIG. 13 in particular, in this partially closed position, with the third bolster 23 abutted against the first assembly 11, a closed forging cavity is formed. This closed forging cavity is defined by the toothed forming surface 20 of tooth die 19, the forming surface 33 of the centre punch 25, and the arcuate forming surfaces 32 of the side dies 24. A closed forging cavity means that there are no gaps between the die elements 19, 25, 24, and the material being forged is confined to the closed cavity. This results in the forging being "fleshless" because there are no gaps between the die elements for flash to form. There is a small clearance between the centre punch 25 and the side dies 24 to allow the centre punch 25 to move relative to the side dies 24, but this clearance is not large enough to allow flash to form.

Referring to FIG. 9 in particular, in this partially closed position, the grippers 39a and 39b grip the bar 6 by means of the gripper halves 40 and 41 surrounding the bar 6. In moving from the open position to this position, the first gripper halves 40 push the pistons 46 downwards until the first gripper halves 40 abut the spacers 43. This compresses the hydraulic fluid in fluid cavities 47 to generate a pressure in the fluid which upwardly biases the first gripper halves 40 to firmly grip the bar 6. The pressure in cavities 47 is generated by restricting the flow of fluid from cavities 47 through ports 48. This may be achieved by a relief valve (not shown) or by closing the ports 48 so that the fluid cannot escape.

Figure 10:
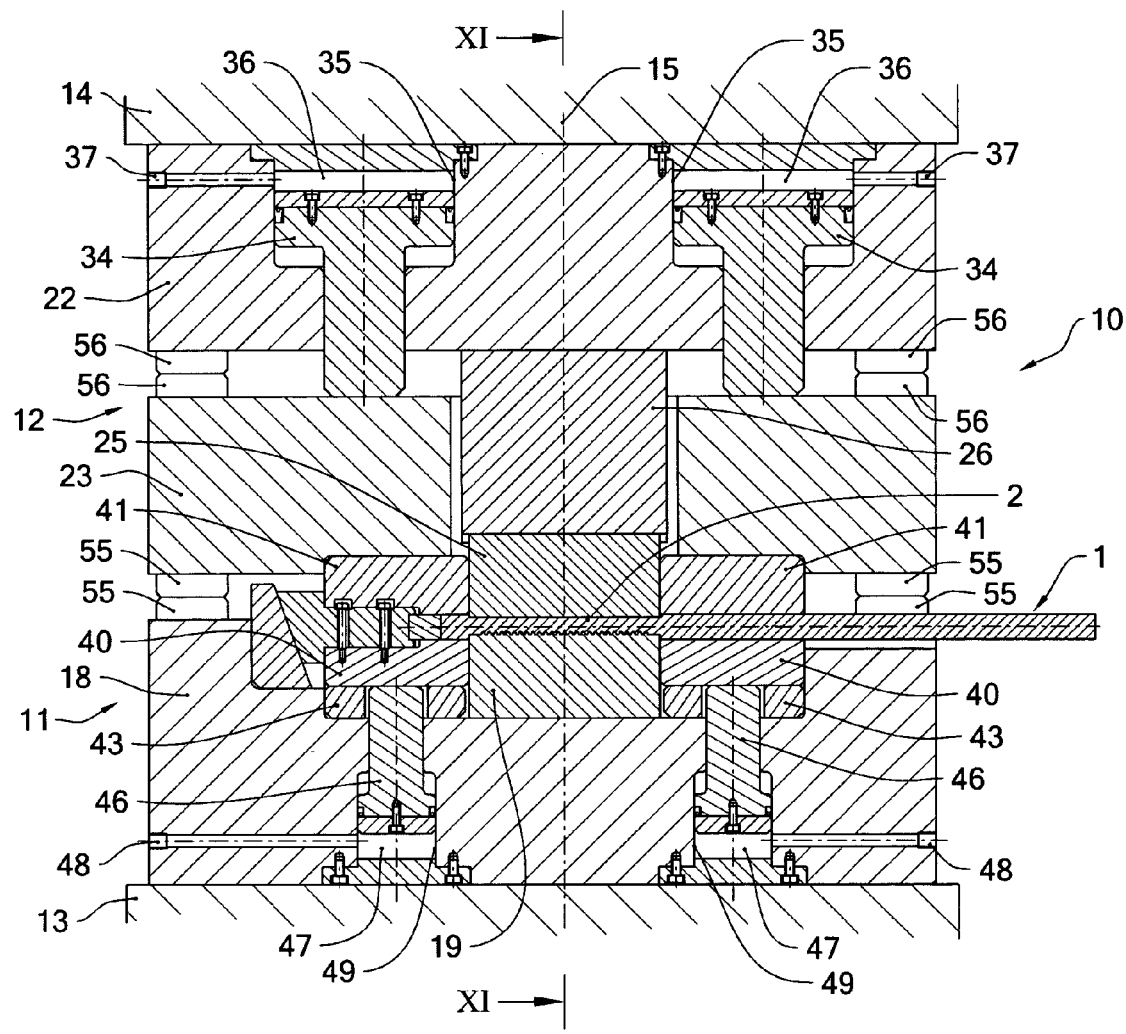
FIG. 10 is a longitudinal sectional view of the die apparatus of FIG. 4, shown in its fully closed position.
Figure 11:
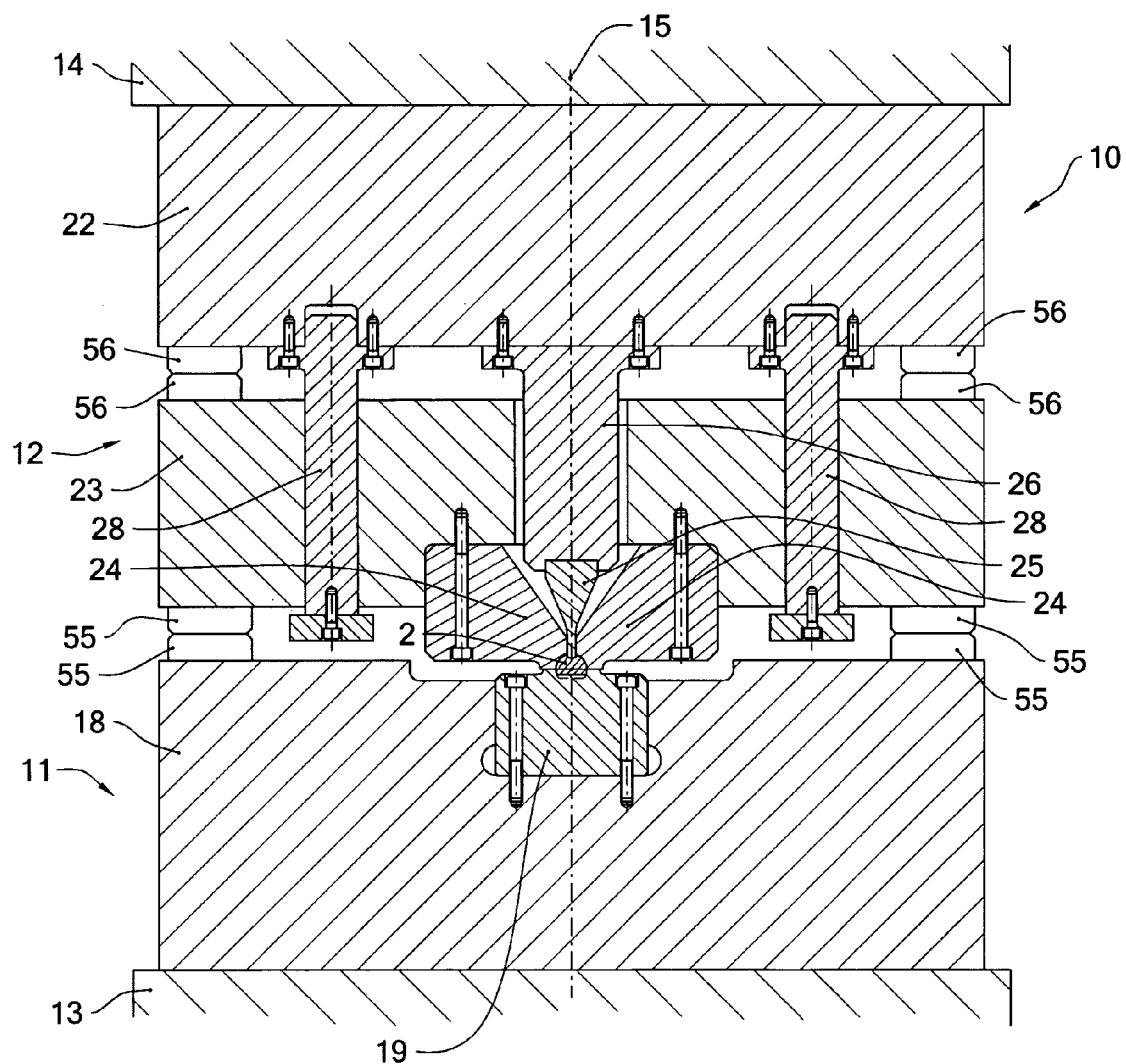
FIG. 11 is a cross section along XI-XI of the die apparatus shown in FIG. 10.
Figure 14:
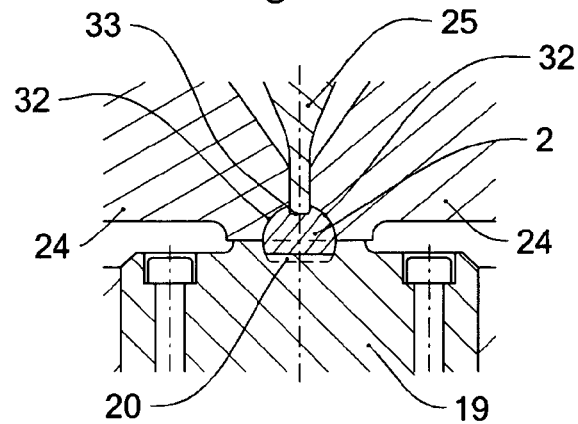

The die apparatus 10 then continues to close until it reaches the fully closed position shown in FIGS. 10, 11 and 14, to complete forging of the rack 1. In moving from the partially closed position of FIGS. 7, 8, 9 and 13 to this fully closed position, there is no further movement of the third bolster 23 and the gripper halves 40 and 41 relative to the first assembly 11.

As the die apparatus 10 continues to close from the partially closed position to the fully closed position, the second bolster 22 moves downwards relative to the third bolster 23 until the second bolster 22 abuts the third bolster 23 by means of the contact blocks 56 abutting each other. During this movement, the pistons 34 bias the third bolster 23 towards the first assembly 11 to prevent the increasing forging pressure in the closed forging cavity from lifting the side dies 24 away from the tooth die 19, and to keep the grippers 39a and 39b closed and in their fully downwards position. The pistons 34 move relative to the second bolster 22, which compresses the hydraulic fluid in the fluid cavities 36. The pressure in cavities 36, acting on pistons 34, is generated by restricting the flow of fluid from cavities 36 through ports 37. This may be achieved by a relief valve (not shown) or by closing the ports 37 so that the fluid cannot escape.

Referring to FIG. 14 in particular, as the die apparatus continues to close from the partially closed position to the fully closed position, the centre punch 25 moves downward with the second bolster 22 to penetrate the closed forging cavity defined by the forming surfaces 20, 32 and 33, thereby completing the forging of the rack 1. The forming surface 33 of the centre punch 25 forms the longitudinal indent 8 in the toothed portion 2 of the forged rack 1. The toothed portion 2 of the rack 1 is formed without flash because the material is trapped in the closed forging cavity. The die apparatus 10 then opens and the forged rack 1 is removed.

Die apparatus 10 is well suited to forging large offset racks because there are no punches entering the forging cavity from the sides of the tooth die 19. This allows the teeth 3 of the rack 1 to be closer to the longitudinal centre line of the rack 1.

Figure 15:
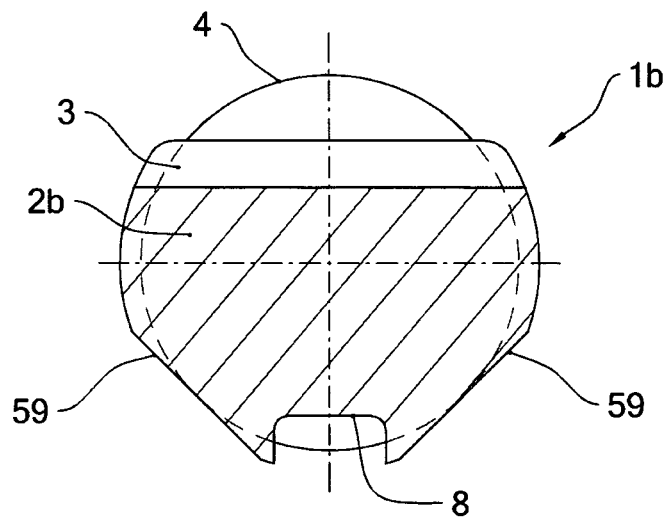
FIG. 15 is a sectional view of a V-rack forged by a die apparatus in accordance with the present invention.

Die apparatuses in accordance with the present invention may be used to forge other types of racks than D-racks. FIG. 15 shows a V-rack 1b forged by a die apparatus in accordance with the present invention. V-rack 1b is the same as D-rack 1 except that V-rack 1b has flat support surfaces 59, instead of the arcuate support surfaces 7 of D-rack 1. The two flat support surfaces 59 are angled to each other in a "V" arrangement.

Figure 16:
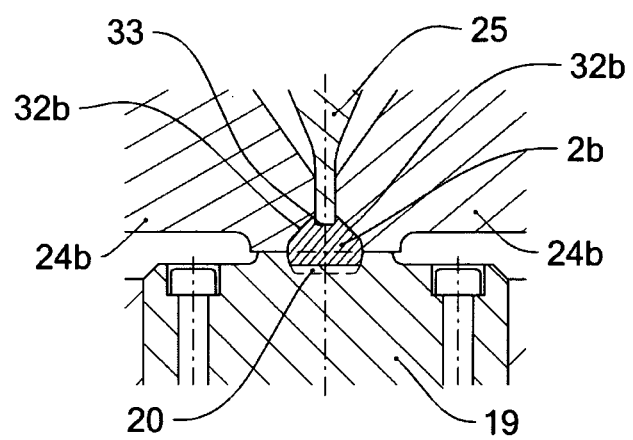
FIG. 16 is a detail sectional view of the die apparatus shown in FIG. 4 fitted with die elements adapted to forge the V-rack shown in FIG. 15.

FIG. 16 shows a detail sectional view of die apparatus 10 fitted with die elements 19, 25 and 24b adapted to forge the V-rack shown in FIG. 15. FIG. 16 shows die apparatus 10 in its fully closed position similar to that shown in FIG. 14. The tooth die 19 and the centre punch 25 are similar to those used to forge the D-rack 1, but the side dies 24b have flat forming surfaces 32b to match the flat support surfaces 59 of the V-rack 1b.

In other not shown embodiments, die apparatuses in accordance with the present invention may be used to forge racks without a long shank 4, or with only a very short shank. These short racks may, be joined to a tube, which forms the shank of the finished rack, by welding or other joining methods. These racks are often referred to as "composite" racks, and are shown for example in WO 2005/028141 A1 (Bishop Innovation). A die apparatus for forging these short racks would be similar to die apparatus 10 described above, except that it would have a means to axial restrain the material between forged at both ends of the rack. This may be achieved by having end stops similar to end stop 51 between both grippers 39*a* and 39*b* of the die apparatus (instead of just one end stop 51, as in die apparatus 10).

The term "comprising" as used herein is used in the inclusive sense of "including" or "having" and not in the exclusive sense of "consisting only of".

As used herein, when a first object is said to "abut" a second object it means that the first object moves towards the second object until it is blocked from further movement by the second object, either by directly contacting the second object or by contacting a spacer or other relatively rigid member placed between the two objects. Therefore the use of the words "abut" or "abutting" does not necessarily require that the objects directly contact each other.

The invention claimed is:

1. A die apparatus for forging a steering rack from a bar, the steering rack comprising a toothed portion, the toothed portion comprising an array of gear teeth, the die apparatus comprising a first and a second assembly, the first and second assemblies being movable towards each other along an axis by means of a press to forge the steering rack, the first assembly comprising a tooth die supported by a first bolster, the tooth die having a toothed forming surface shaped as the obverse of the gear teeth, the second assembly comprising a second bolster, first and second side dies, and a centre punch, the centre punch being disposed between the first and second side dies and opposite the toothed die, characterised in that the second assembly further comprises a third bolster and a bias means, the third bolster being disposed between the first and second bolsters and being movable relative to the second bolster along the axis, the bias means being adapted to bias the third bolster towards the first assembly, the first and second side dies being supported by the third bolster, and the centre punch being supported by the second bolster, the arrangement being such that as the die apparatus closes, the third bolster abuts the first assembly to form a closed forging cavity and then, as the die apparatus continues to close, the centre punch penetrates the closed forging cavity to complete the forging of the steering rack.

2. A die apparatus as claimed in claim 1, wherein the bias means comprises at least one piston, each piston being biased by a hydraulic fluid in a corresponding fluid cavity.

3. A die apparatus as claimed in claim 2, wherein the piston abuts the third bolster and the fluid cavity is in the second bolster.

4. A die apparatus as claimed in claim 1, wherein the die apparatus further comprises at least one gripper adapted to grip the bar as the steering rack is forged.

5. A die apparatus as claimed in claim 4, wherein the gripper comprises a first gripper half carried by the first assembly, and a second gripper half carried by the second assembly, the first and second gripper halves surrounding the bar as the die apparatus closes.

6. A die apparatus as claimed in claim 5, wherein the second gripper half is supported by the third bolster.

7. A die apparatus as claimed in claim 5, wherein the first gripper half is biased towards the second assembly by means of a hydraulic piston.

8. A die apparatus as claimed in claim 4, wherein the at least one gripper comprises two grippers adapted to grip the bar either side of a portion of the bar that is forged into the toothed portion.

9. A die apparatus as claimed in claim 1, wherein the centre punch is attached to a centre punch carrier that is attached to the second bolster, the centre punch carrier passing through an opening in the third bolster.

10. A die apparatus as claimed in claim 1, wherein the toothed portion further comprises a longitudinal indent on the opposite side of the toothed portion to the array of gear teeth and first and second support surfaces either side of the indent, the centre punch having a forming surface shaped as the obverse of the indent, and the first and second side dies having forming surfaces shaped as the obverse of the first and second support surfaces respectively.

11. A die apparatus as claimed in claim 10, wherein the steering rack is a D-rack and the support surfaces are substantially arcuate.

12. A die apparatus as claimed in claim 10, wherein the steering rack is a V-rack and the support surfaces are substantially flat.

13. A method of manufacturing a steering rack from a steel bar comprising the steps of:
  (a) heating a portion of the bar to a temperature suitable for warm forging;
  (b) placing the bar into a die apparatus as claimed in claim 1; and
  (c) closing the die apparatus by means of a press to forge a toothed portion on the bar.

14. A method of manufacturing a steering rack as claimed in claim 13, wherein the temperature is between 650° C. and 800° C.

* * * * *